US006819870B1

(12) United States Patent
Ge et al.

(10) Patent No.: US 6,819,870 B1
(45) Date of Patent: Nov. 16, 2004

(54) ALL-OPTICAL NETWORKING OPTICAL FIBER LINE DELAY BUFFERING APPARATUS AND METHOD

(75) Inventors: An Ge, Plano, TX (US); Lakshman S. Tamil, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/569,488

(22) Filed: May 11, 2000

Related U.S. Application Data

(60) Provisional application No. 60/163,217, filed on Nov. 2, 1999.

(51) Int. Cl.[7] .............................................. H04J 14/00
(52) U.S. Cl. ......................................... 398/51; 398/49
(58) Field of Search ............................. 398/45, 48, 49, 398/47, 54, 50, 57, 51; 365/64, 234

(56) References Cited

U.S. PATENT DOCUMENTS

| | | | |
|---|---|---|---|
| 5,416,769 A | 5/1995 | Karol ........................... | 370/60 |
| 5,469,284 A | 11/1995 | Haas ........................... | 359/139 |
| 5,486,943 A | 1/1996 | Sasayama et al. ........... | 359/123 |
| 5,734,486 A | 3/1998 | Guillemot et al. ........... | 359/139 |
| 5,737,106 A | 4/1998 | Sansonetti et al. ........... | 359/140 |

OTHER PUBLICATIONS

*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs).
*All Optical Networking: Architecture, Control, and Management Issues*, by John M. Senior and Chunming Qiao, SPIE—The International Society of Optical Engineering, Nov. 3–5, 1998, vol. 3531, pp. 456–464.
John M. Senior, et al., SPIE—The International Society for Optical Engineering, "All–Optical Networking 1999: Architecture, Control, and Management Issues" vol. 3843, pp. 111–119, dated Sep. 19–21, 1999.

Jonathan S. Turner, Journal of High Speed Networks 8 (1999) 3–16 IOS Press, "Terabit Burst Switching", pp. 3–16.

Ken–ichi Sato, IEEE Journal and Selected Areas in Communications, vol. 12, No. 1, Jan. 1994, "Network Performance and Integrity Enhancement with Optical Path Layer Technologies", pp. 159–170.

F. Callegati, et al., Optical Fiber Technology 4, 1998 "Architecture and Performance of a Broadcast and Select Photonic Switch*", pp. 266–284.

Soeren Lykke Danielsen, et al., "WDM Packet Switch Architectures and Analysis of the Influence of Tuneable Wavelength Converters on the Performanace".

Soeren L. Danielsen, et al., IEEE Photonics Technology Letters, vol. 10, No. 6, Jun. 1998 "Optical Packet Switched Network Layer Without Optical Buffers".

M.C. Chia, et al., Part of SPIE Conference on All–Optical Networking: Architecture, Control and Management Issues, Nov. 1998, "Performance of Feedback and Feedforward Arrayed—Waveguide Gratings–Based Optical Packet Switches with WDM Inputs/Outputs".

*Primary Examiner*—M. R. Sedighian
*Assistant Examiner*—Christina Y Leung
(74) *Attorney, Agent, or Firm*—Gray Cary; Jessica W. Smith; V. Lawrence Sewell

(57) ABSTRACT

A method for wavelength division multiplexing (WDM) fiber delay line (FDL) optical buffer routing and scheduling of conflicted variable length data packets through an optical router. The method includes ordering of each conflicted variable length data packet and selecting each of the data packets in turn for routing based on the ordering sequence selected. The sequentially assigned conflicted data packet is assigned a wavelength in the FDL optical buffer from (n) available wavelengths, wherein (n)=$\lambda 1, \lambda_1, \ldots, \lambda n, \lambda 1, \lambda_1, \ldots, \lambda n, \ldots$. Each data packet is converted to the sequentially assigned wavelength (n) and routed to an optical buffer according to the wavelength assignment. If the wavelength of the FDL optical buffer is fully occupied the data packet is dropped.

46 Claims, 5 Drawing Sheets

ALL-OPTICAL NETWORKING OPTICAL FIBER LINE DELAY BUFFERING APPARATUS AND METHOD

CROSS REFERENCE TO RELATED APPLICATIONS

This application claims priority under 35 U.S.C. § 119(e) to U.S. provisional application Ser. No. 60/163,217, filed Nov. 2, 1999, entitled "WDM FIBER DELAY LINE BUFFER CONTROL FOR TERA-BIT OPTICAL IP ROUTER", which is hereby fully incorporated by reference.

BACKGROUND OF THE INVENTION

1. Technical Field of the Invention

The present invention relates generally to optical routing of data packets, and more specifically to a fiber delay line (FDL) optical buffering and routing method and system in an optical routing network.

2. Discussion of the Related Art

One of the major trends in networking in late 1990's has been a relentless growth in demand for bandwidth in both enterprise and service provider networks. Driving the need for more bandwidth is a combination of factors. More users are connecting as the commercial Internet offers a new online experience for consumers. Internet computing applications, including multi-tier distributed databases, interactive multimedia communication, and electronic commerce rely on the network and demand network resources. A new generation of high-speed Internet access is emerging to meet bandwidth demands and further amplify core bandwidth requirements.

At the same time, competitive pressures make it imperative that networking costs be reduced even as the demand for capacity and new services increases. Successful companies are constantly on the lookout for new technologies which can provide a competitive edge and increase their cost effectiveness.

Optical networking has emerged as a solution to the bandwidth crunch. In particular, one new optical technology—Dense Wavelength Division Multiplexing (DWDM)—promises to increase the capacity and performance of existing fiber optic backbones. DWDM offers a capacity upgrade solution with greater scalability and lower cost than available alternatives.

Wavelength Division Multiplexing (WDM) is a technique for increasing the information-carrying capacity of optical fiber by transmitting multiple signals simultaneously at different wavelengths (or "colors") on the same fiber. In effect, WDM converts a single fiber into multiple "virtual fibers," each driven independently at different wavelengths. Systems with more than a small number of channels (two or three) are considered Dense WDM (DWDM) systems. Nearly all DWDM systems operate across a range of wavelengths in the 1550 nm low-attenuation window.

A DWDM system generally includes optical transmitters (lasers), an optical multiplexer and demultiplexer, an optical amplifier and optical receivers. DWDM systems use high, resolution, or narrowband, lasers transmitting in the 1550 nm wavelength band.

The optical multiplexer combines the transmit signals at different wavelengths onto a single optical fiber, and the demultiplexer separates the combined signal into its component wavelengths at the receiver. Several technologies are currently used for optical multiplexing and demultiplexing, including thin-film dielectric filters and various types of optical gratings. Some multiplexers are constructed as completely passive devices, meaning they require no electrical input. Passive optical multiplexers behave essentially like very high precision prisms to combine and separate individual colors of the WDM signal. Like prisms, most passive optical devices are reciprocal devices, meaning they function in the same way when the direction of the light is reversed.

Typically the multiplexing and demultiplexing functions are provided by a single device, a WDM multiplexer/demultiplexer. Some multiplexers have the ability to transmit and receive on a single fiber, a capability known as bi-directional transmission.

The optical receiver is responsible for detecting the incoming lightwave signal and converting it to an appropriate electronic signal for processing by the receiving device. Optical receivers are very often wideband devices able to detect light over a relatively wide range of wavelengths from about 1280–1580 nm. This is the reason why some seemingly incompatible devices can actually inter-operate. For instance, directly connecting two otherwise incompatible network interfaces having different transmitter wavelengths is usually not a problem, even though one end may be transmitting at 1310 nm and the other at 1550 nm.

An amplifier is sometimes used to boost an optical signal to compensate for power loss, or attenuation, caused by propagation over long distances. Electronic regeneration of a WDM signal requires a separate regenerator for each wavelength on each fiber. A single optical amplifier, conversely, can simultaneously amplify all the wavelengths on one fiber.

An additional benefit of the optical amplifier is that as a strictly optical device, it is a protocol-and bit rate-independent device. In other words, an optical amplifier operates the same way regardless of the framing or bit rate of the optical signal. This allows a great deal of flexibility in that an optically amplified link can support any combination of protocols (e.g. ATM, SONET, Gigabit Ethernet, PPP) at any bit rate up to a maximum design limit.

Despite the great advances in capacity, flexibility and reliability provided to the internet by the advent of optical routing of data, congestion and data packet loss is still an ongoing problem. An analysis of Internet traffic reveals a fractal or self-similar nature, (i.e., the traffic exhibits variability in all time scales), thus the conclusion is that the internet traffic is far from well behaved and hence congestion and the dropping of data packets are unavoidable. The dropping of a data packet is often the result of blocking, which occurs when two competing packets arrive at an input of the node simultaneously and desire the same output.

Variable length packets produce additional problems, while they can be processed directly they require a routing and scheduling methodology to control buffer occupancy and do not presently provide optimal packet loss rates.

The router includes a scheduling mechanism, an optical switch matrix with control logic capable of executing a method or algorithm, employing optical buffers and a memory for retaining routing information and instructions. It should be noted that there is no random access optical memory at high speeds. Fiber delay line (FDL) optical buffers are used as optical memory in all optical routers. The optical switch matrix and FDL are the building blocks for optical packet switching.

Various techniques have been suggested by the prior art to provide random access memory at high speeds, but have not been successfully implemented. For instance deflection routing, a technique suggested to reduce the probability of blocking, has been analyzed on regular meshed networks such as Manhattan Street (MS) and Shuffle Network (SN) networks, which are suitable for local area networks (LAN) and metropolitan area networks (MAN). The deflection routing technique avoids collisions between packets by deflecting (mis-routing) one of the packets in conflict with another packet in a different direction. If buffers are not available, any mis-routed packets can be temporarily deflected to an undesired link. Thus, deflection routing allows the use of fiber links as optical buffers while maintaining bit-rate transparency.

Queuing management is another technique that has been suggested to reduce the probability of blocking of packets by managing in an intelligent way the injection of packets into the network. If an injection is possible but the packet to be injected is in conflict and the router cannot solve the conflict, the next packet in the queue, with no conflict with the flow-through packets, is selected for injection.

Another technique suggested for conflict reduction is wavelength dimensioning. This technique consists of creating a wavelength over-capacity on the network. For example, this can be achieved if the network uses 16 wavelengths per link and instead of using all of the 16 wavelengths to inject packets, a reduced number of wavelengths are employed. This technique basically reduces the traffic load per wavelength and, therefore, the probability of packet loss at every node. The optical IP routers should be capable of handling both short and long packets efficiently as the IP traffic is bimodal in nature: short packets which are typical of transactional-style flows and large packets, or bursts, that are encountered in the transport of large data blocks.

Accordingly, it is desirable to implement an optical routing system and method using FDL optical buffers to reduce or eliminate dropping of variable length data packets due to blocking conflicts.

SUMMARY OF THE INVENTION

Accordingly, the present invention is directed to a dynamic optical routing system and method employing fiber delay line (FDL) optical buffering for wavelength dimension multiplexing (WDM) of variable length data packets.

Wavelength conversion is a technique utilized in the present invention to reduce the probability of blocking in both circuit-switching and packet-switching wavelength routed optical networks. This technique solves blocking by converting the packets in conflict to other available wavelengths, thereby solving the conflict. As the number of wavelengths used to route the data packets increase, the probability of packet loss decreases.

Optical buffering employs fiber delay lines (FDLs)of different lengths equivalent to a multiple of a data packet duration. The data packet duration corresponds to the number of bits chosen to make up a data packet. The size of the optical buffer, and thus the number of fiber delay lines, is one of the most critical design parameters.

Accordingly, one aspect of the present invention can be characterized as providing a round robin method for routing of data packets. In this aspect of the present invention when new packets arrive at the optical router, they usually come from different ports. In a WDM network, each port is considered as one wavelength. The newly arriving packets can be labeled as a wavelength and a fiber number of the FDL. For instance if the port is number 3 and the fiber is fiber number 2 of the FDL optical buffer, the packet will be denoted as (3,2), which is read as wavelength number three of the input fiber two. If the processing of the new incoming packets is performed in an ascending order based on the fiber and wavelength, it is denoted as "sequence ordering" of the new variable length data packets.

If it is assumed there are (n) wavelengths in one set of FDLs for each output fiber, when new packets are scheduled to arrive at time to the order of the wavelength assignment will be n=$\lambda_1 \lambda_2, \ldots, \lambda_n, \lambda_1, \lambda_2, \ldots, \lambda_n, \ldots$. In the present invention this ordering is called "round robin wavelength assignment".

For example, if it is assumed that there are only three available wavelengths (i.e. n=$\lambda_1, \lambda_2 \lambda_3$) and there are seven data packets to be routed, the ordering of the wavelengths will be as follows: For packet 1, n=$\lambda_1$; packet 2, n=$\lambda_2$, packet 3, n=$\lambda_3$; packet 4 n=$\lambda_1$; packet 5 n=$\lambda_2$, packet 6 n=$\lambda_3$; packet 7, n=$\lambda_1$. In the above example the last wavelength (n) assigned was (n)=$\lambda_1$. For the next batch of conflicted data packets, the algorithm starts the assigning of wavelength process at (n)=$\lambda_2$ and the next wavelength would be n=$\lambda_3$ and so on. In an alternative embodiment, the wavelength assignment could be set to revert to (n)=$\lambda_1$ for each new batch of conflicted data packets or the wavelength could be set to some alternate predetermined wavelength.

In a "Pure round robin wavelength assignment" a method is used wherein, upon the arrival of new packets at the router, the packets are picked in sequence order. Each packet is assigned to a wavelength as per the round robin wavelength assignment procedure. The packet will be assigned to a wavelength without knowing the occupancy status of the FDL optical buffer. If the wavelength of the assigned fiber is full, then the packet will be dropped. This procedure will be repeated until all the newly arrived packets are processed.

Another aspect of the present invention can be characterized as providing a round robin method with memory for routing of data packets. In this method, upon the arrival of new packets at the router, a controller will select the packets in sequence or some predetermined order or randomly. A wavelength is selected for each packet in the FDL buffer according to the round robin rule. Each assignment of wavelength is stored in a memory and the occupancy of the wavelength is noted. If this wavelength is full, that is, the total number of time slots in this wavelength has been used to handle other data packets, the wavelength is marked as full and no additional packets will be assigned to it. This procedure is repeated for each wavelength. If all wavelengths are fully occupied, then the remaining packets will be dropped. This procedure guarantees the full utilization of the FDL optical buffer.

In an alternate embodiment the wavelength (n) can be selected in predetermined order. For instance, the assignment process could first exhaust the even wavelengths (n) and then the odd wavelengths until all wavelength (n) in the FDL are exhausted. Realistically any predetermined ordering is applicable as long as each wavelength (n) is utilized before a wavelength is used a second, third, or nth time.

In an alternate embodiment, the wavelength may be polled later to review its status in case its FDL buffer has cleared some of the wavelengths and if so the wavelengths are placed back in service. The polling may be triggered by a predetermined time or a predetermined number of drops criteria. This aspect would most likely be employed in very high traffic scenarios wherein a large number of packets are arriving at the router simultaneously, but after the initial surge the number or arrivals slows.

A further aspect of the present invention can be characterized as providing a round robin with memory and determining a minimally occupied FDL fiber wavelength for routing of data packets. This modification of the round robin with memory method employs additionally the finding of the minimally occupied wavelength of the FDL optical buffer. Newly arriving packets are picked in sequence order, as in the round robin with memory method, and before assigning a wavelength to the new packet, the minimum occupancy wavelength of the FDL optical buffer is determined. The packet is then assigned to this wavelength. If the shortest occupancy buffer is full, then by default, all buffers are full and, therefore, all remaining packets are dropped. For each new packet, this procedure is repeated until the newly arrived data packets are exhausted or a determination is made to drop all remaining packets.

In an alternate embodiment, after a predetermined period of time or predetermined number of dropped data packets the algorithm resumes determining the minimally occupied wavelength as some of the FDL wavelengths may have cleared and now have capacity to receive new data packets. This is especially the case wherein the FDL optical buffer has a default wavelength of long duration wherein data packets are dumped for an extended period to decrease the probability that the data packets will be dropped. The assignment process continues until all data packets are assigned or until the command is sent to drop all packets.

A still further aspect of the present invention can be characterized as providing a "shortest packet first then assign to minimum occupancy buffer" method. In this method incoming packets are sorted in ascending order based on the data packet size, wherein the shortest length data packet is processed first. Each packet will be assigned to the least occupied wavelength as described above. The memory will be updated to reflect the new assignment and the next new arriving data packet will be processed in the sorted order and assigned to the updated least occupied wavelength.

Additional aspects and advantages of the invention will be set forth in part in the description which follows, and in part will be obvious from the description, or may be learned by practice of the invention. The aspects and advantages of the invention will be realized and attained by means o the elements and combinations particularly pointed out in the appended claims.

To achieve these and other advantages, and in accordance with the purpose of the present invention, as embodied and broadly described, the present invention can be characterized according to one aspect as a method for wavelength division multiplexing (WDM) fiber delay line (FDL) optical buffer routing and scheduling of conflicted variable length data packets through an optical router. This method includes the steps of ordering of each conflicted variable length data packet and selecting each of the data packets in turn for routing based on the ordering sequence. The method then sequentially assigns each conflicted data packet a wavelength in the FDL optical buffer from (n) available wavelengths, wherein (n)=$\lambda_1, \lambda_2, \ldots, \lambda_n, \lambda_1, \lambda_2, \ldots, \lambda_n, \ldots$ Each data packet is then converted to the sequentially assigned wavelength (n) and the data packets are routed to an optical buffer according to the wavelength assignment. The method further determines if the wavelength of the FDL optical buffer is fully occupied and if so the data packet is dropped.

The present invention can be characterized according to another aspect of the present invention as system for wavelength division multiplexing (WDM) fiber delay line (FDL) optical buffer routing and scheduling of conflicted variable length data packets through an optical router employing a memory. The system includes a fiber delay line optical buffer, an optical router, wherein the optical router is capable performing the steps of: ordering each conflicted variable length data packet; selecting each of the data packets in turn for routing based on the ordering sequence; sequentially assigning each conflicted data packet a wavelength in the FDL optical buffer,from (n) available wavelengths, wherein n=$\lambda_1, \lambda_2, \ldots, \lambda_n, \lambda_1, \lambda_2, \ldots, \lambda_n, \ldots$ ; converting each data packet to the sequentially, assigned wavelength (n); and routing the data packets to an optical buffer according to the wavelength assignment, wherein if the wavelength of the FDL optical buffer is fully occupied the data packet is dropped.

The present invention can be characterized according to a further aspect of the present invention as a method for wavelength division multiplexing (WDM) fiber delay line (FDL) optical buffer routing and scheduling of conflicted variable length data packets through an optical router. The method includes the means for ordering of each conflicted variable length data packet, means for selecting each of the data packets in turn for routing based on the ordering sequence, means for sequentially assigning each conflicted data packet a wavelength in the FDL optical buffer from (n) available wavelengths, wherein (n)=$\lambda_1, \lambda_2, \ldots, \lambda_n, \lambda_1, \lambda_2, \ldots, \lambda_n, \ldots$ Means for converting each data packet to the sequentially assigned wavelength (n) are employed as well as means for routing the data packets to an optical buffer according to the wavelength assignment, and determining if the wavelength of the FDL optical buffer is fully occupied and if so the data packet is dropped.

The present invention can be also characterized according to a still further aspect of the present invention as a method for wavelength division multiplexing (WDM) fiber delay line (FDL) optical buffer routing and scheduling of conflicted variable length data packets through an optical router employing a memory. The method includes the steps of ordering of each conflicted variable length data packet and selecting each of the data packets in turn for routing based on the ordering sequence and then sequentially assigning each conflicted data packet a wavelength in the FDL optical buffer from (n) available wavelengths, wherein n=$\lambda_1, \lambda_2, \ldots, \lambda m_n, \lambda_1, \lambda_2, \ldots, \lambda_n, \ldots$ The wavelengths of the FDL optical buffer that each data packet was assigned to is stored in memory and the occupancy status of each wavelength in the FDL optical buffer is also stored in memory. Each data packet is converted to the sequentially assigned wavelength (n) and the data packets are routed to the FDL optical buffer according to the wavelength assignment, wherein a determining if the stored occupancy status of the assigned wavelength of the FDL optical buffer is fully occupied and if so that wavelength is marked as full and no further data packets will be assigned to that wavelength and the assignment of wavelengths will continue sequentially eliminating any wavelength marked as full and a data packet will only be dropped after all wavelengths are marked as full.

The present invention can be characterized according to another aspect of the present invention as a method for wavelength division multiplexing (WDM) fiber delay line (FDL) optical buffer routing and scheduling of conflicted data packets through an optical router with memory, the method including the steps of ordering of each conflicted data packet:

(a) means for selecting in ordered sequence each of the data packets for routing;

(b) means for selecting a next wavelength (n) in sequence to be assigned from (n) available wavelengths of said FDL optical buffer, wherein the sequencing of (n) is (n)=$\lambda_1$, $\lambda_2, \ldots, \lambda_n, \lambda_1, \lambda_2, \ldots, \lambda_n, \ldots$;

(c) means for determining if a buffer capacity of the wavelength (n) selected, wherein if the data packet length is less than or equal to the buffer capacity of the wavelength (n) selected the data packet is assigned to the wavelength, and wherein if the data packet length is greater than the buffer capacity, recording the wavelength (n) in memory and steps (b) and (c) are repeated until all wavelengths (n) have been exhausted and recorded or a suitable wavelength is located, if no wavelength has sufficient capacity the data packet is dropped and the next data packet is selected;

means for converting each data packet to the assigned wavelength (n); and means for routing the data packets to an optical buffer according to the wavelength assignment, and repeating steps (b) and (c) until all conflicted data packets are exhausted.

The present invention can be characterized according to a still further aspect of the present invention as a method for wavelength division multiplexing (WDM) fiber delay line (FDL) optical buffer routing of conflicted variable length data packets through an optical router having a memory, to minimize wavelength occupancy, the method including the steps of:

ordering of each conflicted variable length data packet;

(a) selecting each of the data packets in turn for routing based on the ordering sequence;

(b) determining occupancy status of each wavelength in a FDL optical buffer and storing occupancy status to a memory;

(c) determining a minimally occupied wavelength (n) of the FDL optical buffer;

(d) converting the wavelength of the selected data packet to the wavelength of the minimally occupied wavelength and routing the selected data packet to the minimally occupied wavelength;

(e) updating the occupancy status of each wavelength in the FDL optical buffer and storing to memory;

(f) selecting the next data packet and repeating steps (c) through (e) for each data packet, wherein if it is determined that the minimally occupied wavelength cannot accept the data packet, the data packet and all subsequent data packets are dropped.

The present invention can be characterized according to another aspect of the present invention as a method for wavelength division multiplexing (WDM) fiber delay line (FDL) optical buffer routing of conflicted variable length data packets through an optical router including a memory to a minimum occupancy wavelength. The method includes the steps of; ordering of each conflicted variable length data packet; (a) selecting each of the data packets in turn for routing based on the ordering sequence; (b) determining occupancy status of each wavelength in a FDL optical buffer and storing occupancy status to a memory; (c) determining a minimally occupied wavelength of the FDL optical buffer; (d) converting the wavelength of the selected data packet to the wavelength of the minimally occupied wavelength and routing the selected data packet to the minimally occupied wavelength; (e) updating the occupancy status of each wavelength in the FDL optical buffer and storing to memory; (f) selecting the next data packet and repeating steps (c) through (e) for each data packet, and if it is determined that the minimally occupied wavelength cannot accept the data packet, the data packet and all subsequent data packets are dropped.

The present invention can be characterized according to another aspect of the present invention as a method for wavelength division multiplexing (WDM) fiber delay line (FDL) optical buffer routing of conflicted variable length data packets through an optical router including a memory to a minimum occupancy wavelength. The method including the steps of ordering of each conflicted variable length data packet by shortest length data packet to longest length data packet; (a) selecting each of the data packets in turn for routing based on the ordering sequence; (b) determining occupancy status of each wavelength in a FDL optical buffer and storing occupancy status to a memory; (c) determining a minimally occupied wavelength of the FDL optical buffer; (d) converting the wavelength of the selected data packet to the wavelength of the minimally occupied wavelength and routing the selected data packet to the minimally occupied wavelength; (e) updating the occupancy status of each wavelength in FDL optical buffer and storing to memory; (f) selecting the next data packet and repeating steps (c) through (e) for each data packet, and if it is determined that the minimally occupied wavelength cannot accept the data packet, the data packet and all subsequent data packets are dropped.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the present invention and, together with the description, serve to explain the principles of the invention.

Other objects and advantages will be apparent from a reading of the specification and appended claims in conjunction with the drawings wherein:

DESCRIPTION OF THE INVENTION

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims. Wherever possible, the same reference numbers will be used throughout the drawings to refer to the same or like parts.

Figure 1:
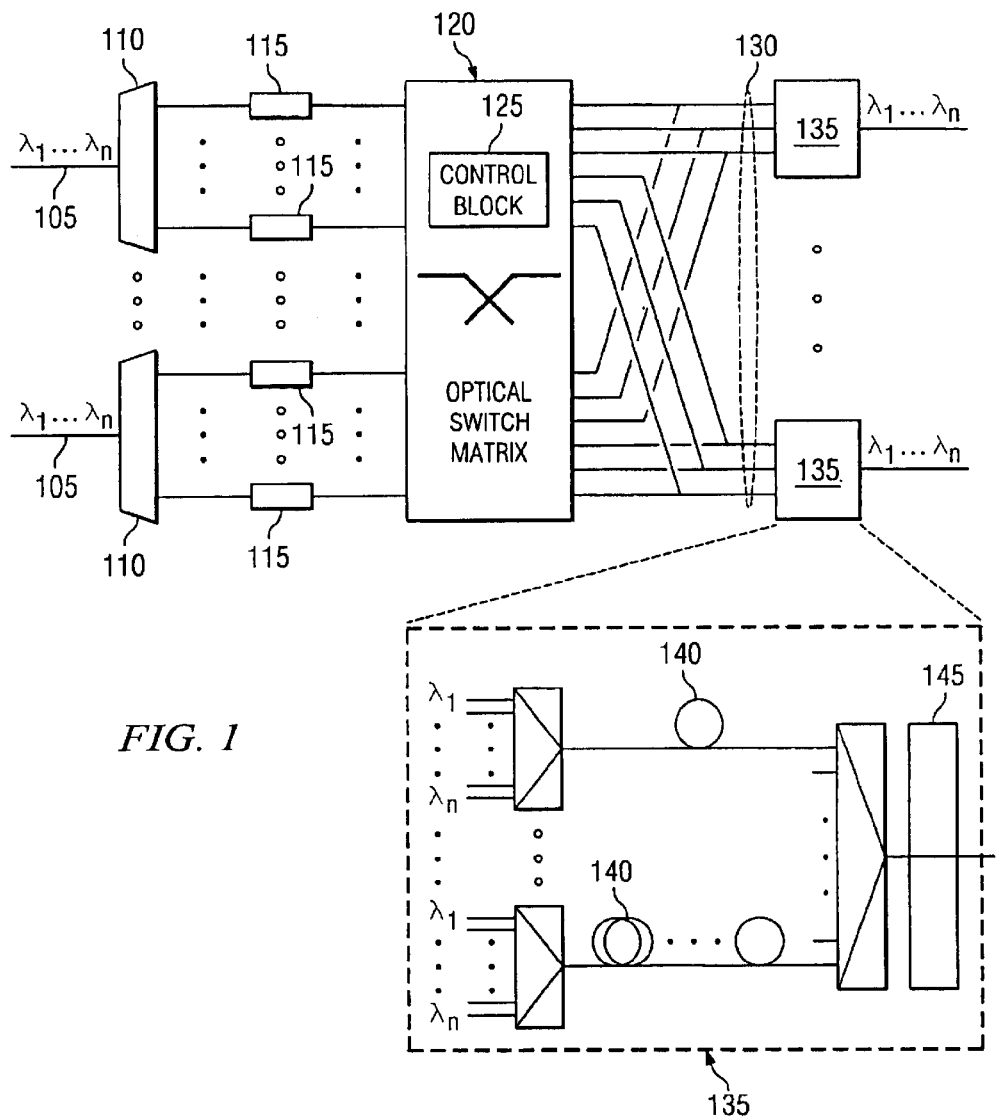
FIG. 1 is a schematic diagram of and optical routing system with fiber delay lines of the present invention.

FIG. 1 illustrates a standard optical routing system and architecture for IP packet routing and scheduling. Generally speaking, various optical packet switching architectures can be implemented for Internet Protocol (IP) packet routing. In FIG. 1 a broadcast and select switch (BSS) architecture is shown, but any number of different architectures may be employed.

When packets arrive at the input of the optical router, internal wavelengths are assigned based one of several control algorithms. If there is no packet on the input port in a time slot (t), then there is no wavelength assigned. All the packets that are assigned to different wavelengths are multiplexed together. At an output, a switch selects the packets assigned for a specific output.

Each data packet has a header, sometimes called overhead, which precedes the actual data packet or payload. The header contains data relating to the data packet, such as the packet size, the originating and terminal ports, the wavelength transmitted on and other relevant data. The header is routed to the optical router capable of making decisions and direct routing as to how and when a data packet is to be routed.

The fact that in optical IP packet switching networks the packet length is variable, in order to assign a wavelength to new packets arriving at the optical switch a control algorithm is implemented by the present invention to fully utilize fiber delay lines (FDLs) as buffers to facilitate switching and decrease data packet loss. In an FDL optical buffer, delay time is pre-determined by the length of the optical fiber. Packets must be scheduled and put into a the proper buffer position by the control algorithm. The control algorithm directs on/off switches depending on the algorithm chosen that best coincides with the packet loss and complexity requirements of the network.

As previously stated, at the output of the optical router there are switches to route the data packets to various FDLs. Each FDL buffer has a set of logic output queues with multi-servers. The number of independent queues is the same as number of output wavelengths. When more than n (number of wavelengths at each output fiber) packets compete for one output fiber, some of them are delayed to avoid conflict. If the packet is more than one time slot long, then the output wavelength may be occupied until whole packet is transmitted. In both cases, the buffer is not free to receive other packets. Here buffer occupancy is defined as the-number of time slots taken to empty the queue.

If the number of input optical fibers is (N) and it is assumed that there are (n) wavelengths per fiber the total number of internal wavelengths available is (n)*(N). When the new packets arrive, the order of wavelength assignment is (n)=$\lambda_1, \lambda_2, \ldots, \lambda_n, \lambda_1, \lambda_2, \ldots, \lambda_n, \ldots$ This round robin wavelength ordering is called naturally a round robin wavelength assignment.

With the general background, operation of the system and assumptions now in place a detail description of the present invention will now commence.

FIG. 1 depicts an schematic diagram of an optical routing system 100. The optical routing system 100 receives variable length data packets from numerous ports 105 at different wavelengths. Prior to the arrival of each variable length data packet, a data packet header precedes it. The packet headers enter into optical router or switch 120. Control block 125 of the optical router 120, operating pursuant to a routing algorithm, schedules the routing of each subsequently arriving data packet according to the corresponding header information.

Those skilled in the art will note that the description of the invention is described as if the packets are arriving at the optical router 120 and then the routing is determined. In actuality the header has arrived ahead of the data packet, (i.e. the payload) and a determination is made as to where, when and how the packet will be routed or whether it is to be dropped.

Upon the arrival of the data packets at port or node 105 the data packets enter into and are multiplexed or de-multiplexed at multiplexor/demultiplexor 110. Tunable wavelength converters (TWC) change the original wavelength of the data packet to the wavelength assigned by control block 125. The data packets then enter into optical router 120 and are forwarded to switch 130 for routing to a fiber delay lines (FDLs) optical buffer 135. The switch is in actuality a plurality of switches totaling (N)*(n) and they act as on/off switches permitting only the those data packets assigned to a specific FDL to enter. Once entering the FDL 135 the packets will travel on the assigned fiber at the assigned wavelength and exit the FDL after completing the loop. The data packets exit FDL 135 and then enter switch 145, which are substantially similar to the switch 130, and are routed to their final destination.

Those skilled in the art will note that typically, the optical buffer 135 has multiple fiber delay lines(FDLs) (not shown). A FDL is a fiber optic cable of a certain length corresponding to the time duration T required for a data packet of one (1) time duration T to completely pass a point in the fiber cable. For instance if the Internet Protocol (IP) sets the size of a data packet as containing 1000 bits (T) will be the time it takes for all 1000 bits of the data packet to pass a point across a fiber optic cable. The IP or other protocol employed could set data packet size at 10 bits, 100 bits, a megabit or any other bit count.

The length of the FDLs will change according to the data packet size (i.e. number of bits) and hence T. The size of the optical buffer, and thus the number of fiber delay lines, is one of the most critical design parameters in optical buffering.

The FDLs 140 in the optical buffer 135 will be multiples of T and can be of any length as previously noted. Typically FDLs are chosen in increments of 1T and 2T with a third having a much longer time duration T such as 10T or 50T. It should be noted that practically any length or configuration can be chosen pending on the criteria set by the system administrator or a configuration required because of the type of application. In operation the data packets are routed to one of the FDLs depending on the amount of delay required to resolve the conflicts or dumped to the longest or default FDL and routed or dumped upon emergence from the FDL.

If there are no other packets arriving at that the arrival time (t) as the data packet in question or there is excess capacity in the optical router 115 the data packet is routed without delay by optical buffer 120. If there is a conflict then the packet is delayed by being routed to one of the FDLs 120–130. If the FDLs are full then the packet is dropped.

Figure 2:
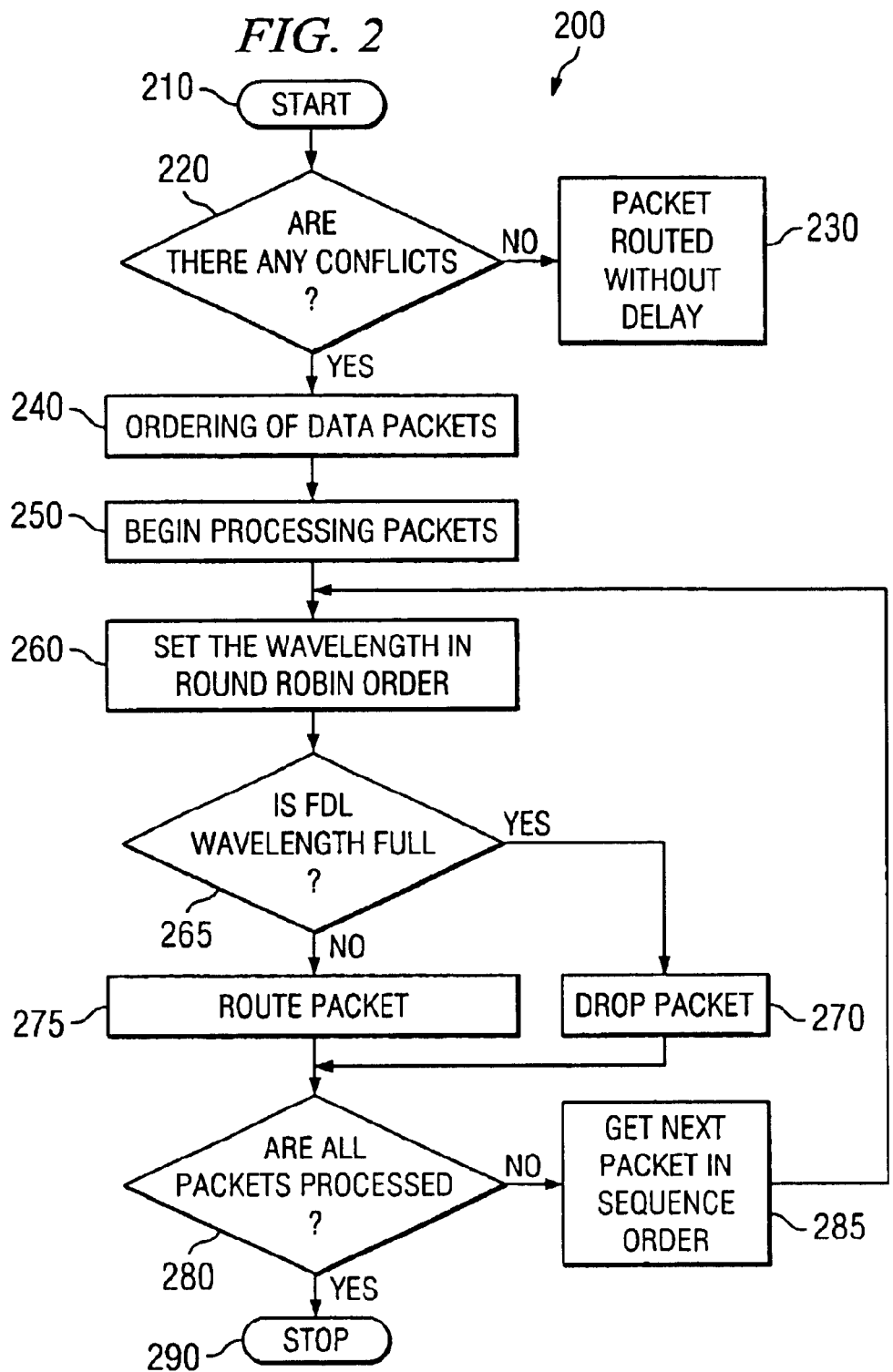
FIG. 2 is a flow chart logic diagram illustrating the logic of a round robin algorithm of the present invention.

FIG. 2 illustrates a flow diagram of the logic utilized in a "Pure round robin wavelength assignment" algorithm 200 of the present invention. Control block 125 of the optical router 120 of FIG. 1, operates pursuant to algorithm 200 when routing the data packets. At step 210 the header, which precedes the arrival of the variable length data packet, enters optical router 120. The optical router 120 includes control block 125 which is capable of operating pursuant to and executing the algorithm 200.

At step 220 a decision is made whether there is a conflict between data packets due to arrive a time (t0). If the answer to the query at step 220 is no the data packet is scheduled to be routed pursuant to step 230 without delay. If the determination at step 220 is yes, the packets are then ordered at step 240 in sequence order based on their wavelength and fiber number. Although the packets are sequenced based on the wavelength and fiber as explained above, the packets can be ordered in any fashion or taken at random.

Control is then passed to step 250 wherein a first packet is taken in sequence order and is assigned a wavelength pursuant to step 260 in round robin order (i.e. if there are n wavelengths available the wavelength assignment is (n)=$\lambda_1$, $\lambda_2, \lambda_3, \ldots, \lambda_n, \lambda_1, \lambda_2, \lambda_3, \ldots, \lambda_n, \ldots$). The wavelength assignment is performed by the TWCs, as shown in FIG. 1, when the data packet subsequently arrives at port 105.

It should be noted that the new wavelength assigned to the data packet may, by coincidence, be the same as the originating wavelength. In a true round robin assignment algorithm the wavelength will be changed to the assigned wavelength. In an alternate embodiment if the wavelengths coincide the wavelength is not be changed.

At step 260 each packet is assigned a wavelength without knowing the occupancy status of the FDL of optical buffer 135. At step 265 it is determined whether the wavelength of the assigned fiber is full. If the buffer is full, the packet will be dropped pursuant to step 270 and the fact that the wavelength of that fiber is full is recorded in memory. The process then proceeds to step 280. If the FDL wavelength is not full, control then passes to step 275.

At step 275 and the data packet is routed according to its assignment and memory in the control block 125 is updated to reflect the routing of this data packet. At step 280 it is determined whether there are any more data packets still in the queue that are due to arrive at time to. If the determination is yes, the process proceeds to step 285 wherein a next data packet is chosen and steps 260, 265, 270, 275, 280 and 285 are repeated, if necessary, until all the newly arrived packets are processed.

If the determination at step 280 is that there are no more packets in the queue, the control passes to step 290 and the algorithm terminates, resets, and assumes a wait mode until a new set of data packets headers arrive for processing to route the subsequent corresponding data packets.

Figure 3:
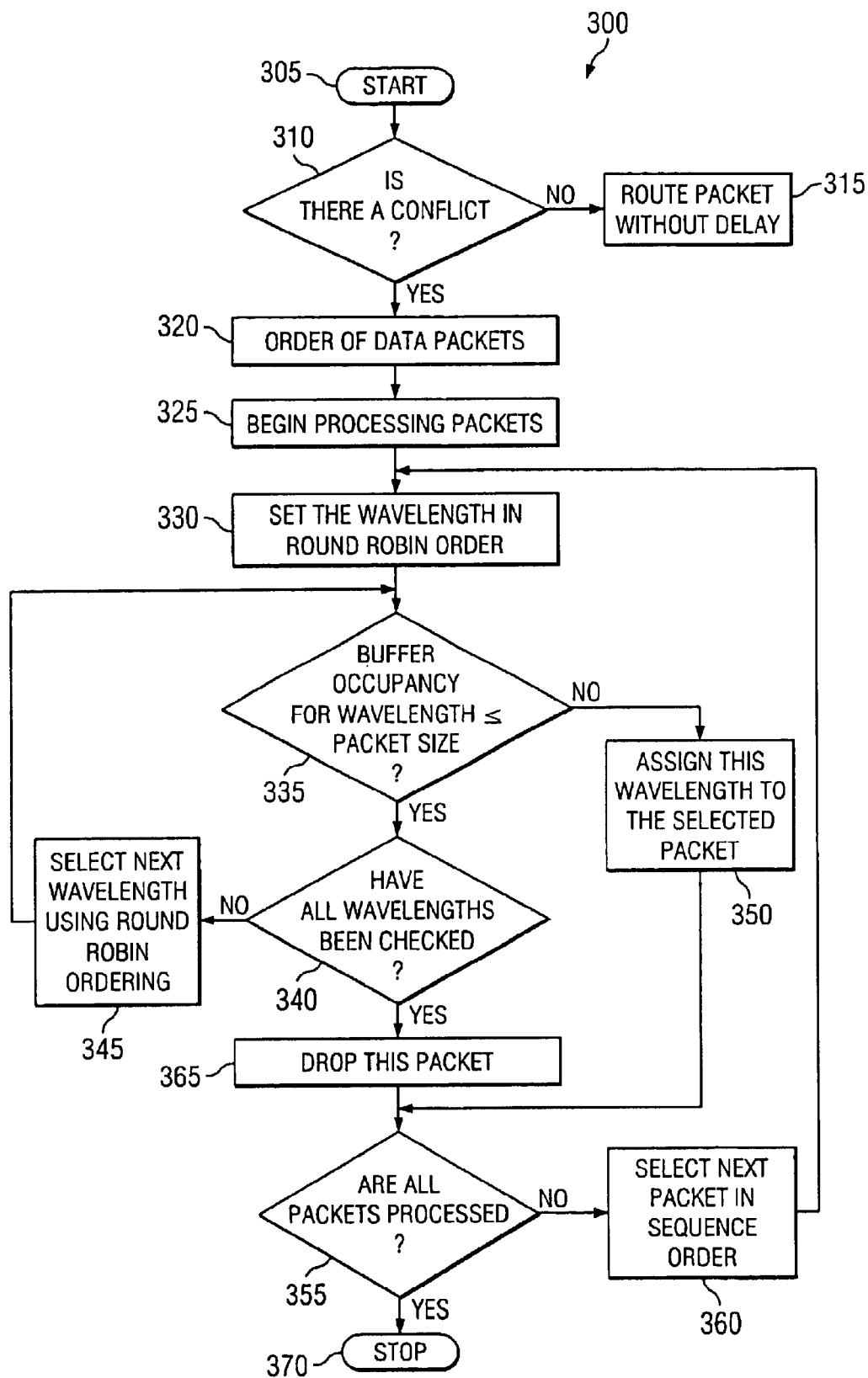
FIG. 3 is a flow chart logic diagram illustrating the logic of a round robin with algorithm with memory of the present invention.

FIG. 3 is a flowchart schematic of a round robin algorithm with memory. Steps 305, 310, 315, 320, and 325 correspond to steps 210, 220, 230, 240, and 250, respectively of FIG. 2 and will not be described further. The description of the algorithm will start at step 330.

At step 330 of FIG. 3 the packet and wavelength are selected based upon the round robin assignment as previously described. Additionally, the selection is recorded in a memory, not shown, of the control block 125. Control then proceeds to step 335 where it is determined if the buffer occupancy, available buffer capacity β for that wavelength (n), for the selected fiber and wavelength is less than the data packet size to be assigned to it. If the determination is no (i.e. that there is sufficient buffer capacity β for that wavelength), control passes to step 350 wherein the selected wavelength and fiber performed by step 330 is ultimately assigned to the data packet. Control then passes to step 355 where it is determined if there are additional data packets to be processed.

If it is determined at step 355 that all data packets have been processed then control passes to step 370 wherein the algorithm is terminated, reset and awaits the next packet header for processing and the routing and scheduling of the subsequent data packet. If the determination at step 335 is yes, that there are additional packets, then control passes to step 360 wherein the next data packet is'selected. Control then passes to step 330 and the next wavelength is selected in the round robin assignment queue and the process is repeated until all data packets in the queue are exhausted.

Now returning to step 335, if the determination that the data packet size is greater that the buffer capacity β, control passes to step 340. At step 340 a determination is made whether other wavelengths and fiber lines have been check.

If the determination is no, (i.e. the packet is larger than the available capacity of the buffer), control will pass to step 345.

It should be noted, that in a pure round robin assignment and algorithm as illustrated in FIG. 2 and described above the packet would be dropped and the next data packet would be assigned the next wavelength regardless of whether the next data packet is of a size less than the buffer capacity of that wavelength. The algorithm simply assigns wavelengths based upon the next wavelength in turn without any other consideration.

At step 345 the next wavelength in the queue is selected for the data packet and control is forwarded to step 335 where the process of determining if there is sufficient capacity is available at this new wavelength. The steps of 335, 340 and 345 will be repeated with this and subsequent data packets until a wavelength is found that has capacity. For example if $\lambda_3$ is full step 345 will attempt to assign the data packet to $\lambda_4$ wavelength. If this wavelength is full successive attempts to assign the packet will be made until all $\lambda m_1$, through $\lambda_n$ wavelengths are attempted. In this example the last attempted wavelength will be $\lambda_2$ and not until this attempt fails will the packet be dropped.

At step 340 if the determination that all wavelengths have been checked; control then passes to step 365. At step 365 the determination is made to drop the data packet and control then passes to step 355. At step 355, as previously stated it is determined whether there are additional packets to be processed and if so control passes to step 360 and the process repeats itself until all packets are processed and the algorithm passes to step 370 as previously described.

Figure 4:
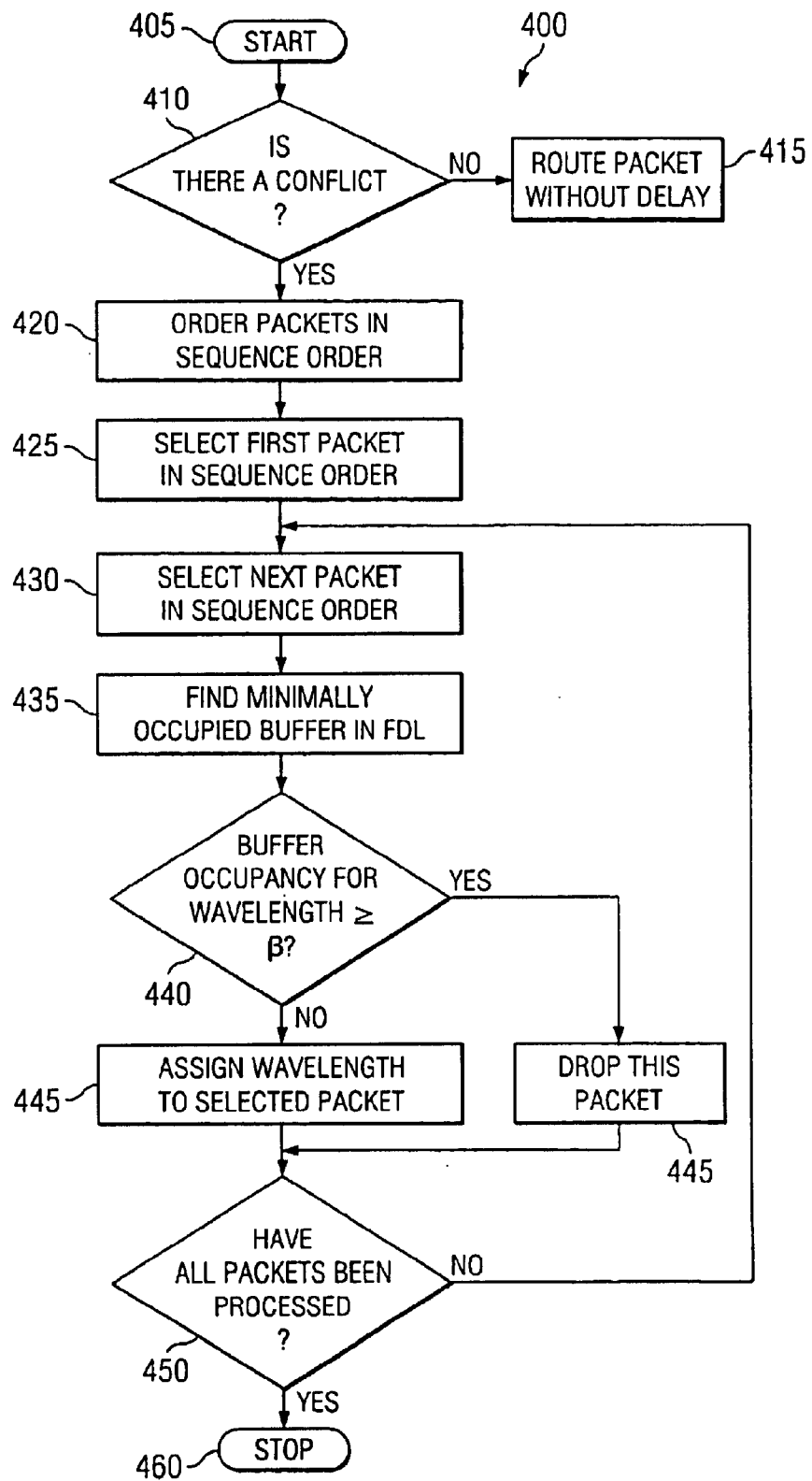
FIG. 4 is a flow chart logic diagram illustrating the logic of a round robin algorithm of the present invention.

FIG. 4 depicts a schematic flowchart of a round robin with memory and finding minimum occupancy of the buffer algorithm. Steps 405, 410, 415 and 420 correspond to steps 305, 310, 315 and 320, respectively, and will not be discussed further. At step 425, in a preferred embodiment, the data packets are sorted in sequence order based on the wavelength and fiber. Once again the packets could be taken randomly or any in other suitable order. In an alternate embodiment the data packets are sorted by size first.

At step 430 the data packets are selected in sequence order, although the data packets could be selected by size (i.e. largest or smallest data packets first). Control then passes to step 435 where a minimally occupied buffer in the fiber delay line (FDL) optical buffer is determined. Control then passes to step 440. At step 440 it is determined if the buffer occupancy β for the minimally occupied wavelength is less than the size of the data packet under consideration. If the determination is no (i.e. there is sufficient capacity in the buffer to receive the data packet) control is passed to step 445.

At step 445 the wavelength that was selected at step 430 is assigned to the data packet and control proceeds to step 450. At step 450 it is determined whether there are additional packets to be processed. If the determination is yes then control passes to step 430, wherein the selection process is repeated. If the determination at step 450 is no (i.e. no more packets to process), the control is passed to step 460. At step 460 the algorithm is halted and reset and awaits the next data packet header for the routing and scheduling of subsequent data packets.

Returning now to step 440, if the determination is yes, (i.e. that the data packet is greater than the minimally identified occupied buffer in the FDL) control passes to step 455. At step 455 the packet in question is dropped and control passes to step 450.

After all packets have been processed, control passes to step 460 where the algorithm is halted and awaits the next group of data packet headers and subsequent data packets to be processed, scheduled and routed.

Figure 5:
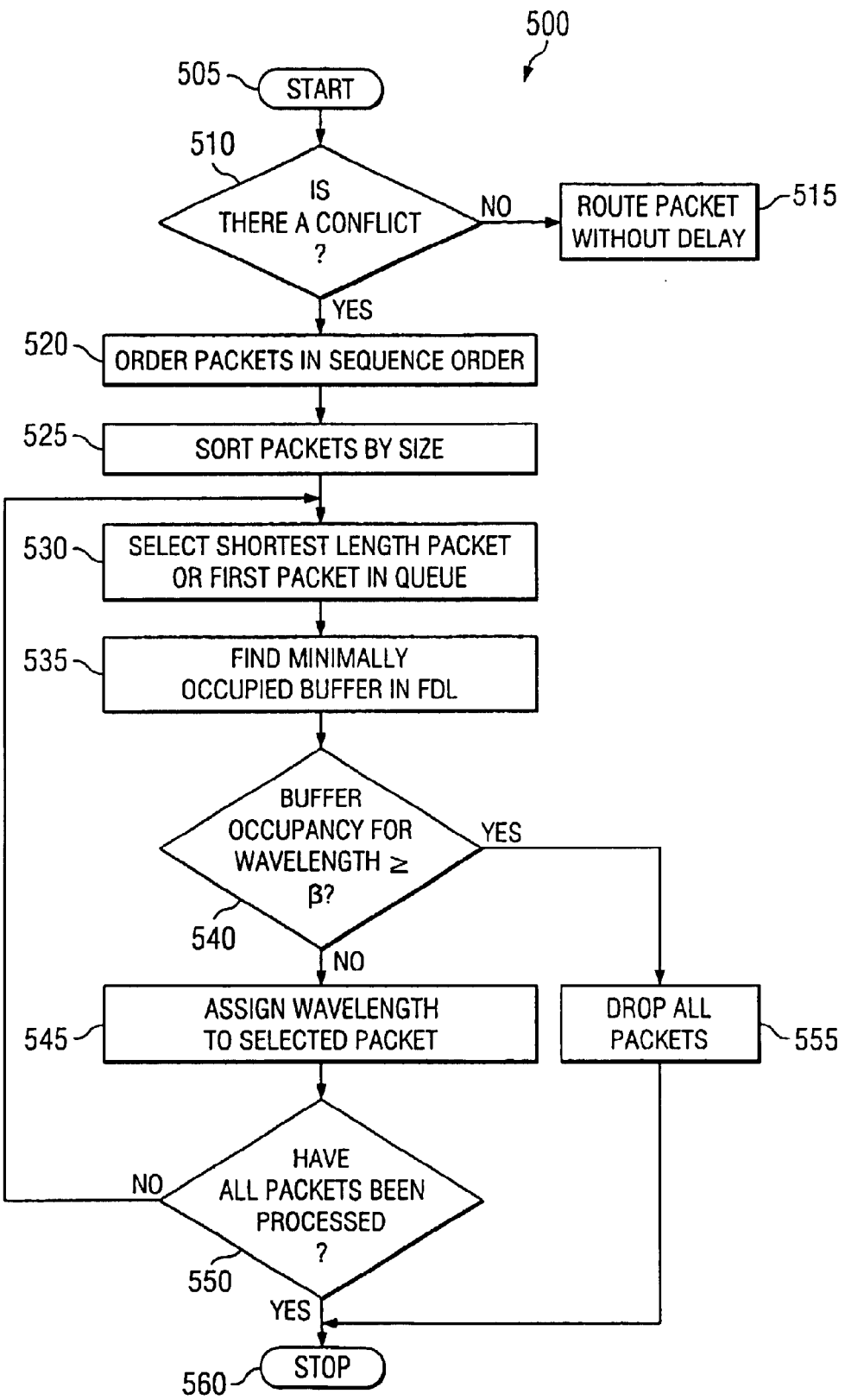
FIG. 5 is a flow chart logic diagram illustrating the logic of a round robin algorithm of the present invention.

FIG. 5 depicts a schematic flowchart for a round robin with memory and updating the memory before the next selection.

Steps 505, 510, 515 and 520 correspond to steps 405, 410, 415 and 420, respectively, and will not be discussed further. At step 525, in a preferred embodiment, the data packets are sorted by size It should be noted again the packets could be taken randomly or any in other suitable order.

At step 530 the data packets are selected by size, in a preferred embodiment the data packets are selected by smallest data packet first. Control then passes to step 535 where a minimally occupied buffer in the fiber delay line (FDL) optical buffer is determined. Control then passes to step 540. At step 540 it is determined if the buffer occupancy β for the minimally occupied wavelength is less than the size of the data packet under consideration. If the determination is no (i.e. there is sufficient capacity in the buffer to receive the data packet) control is passed to step 545.

At step 545 the wavelength that was selected at step 430 is assigned to the data packet and control proceeds to step 550. At step 550 it is determined whether there are additional packets to be processed. If the determination is yes then control passes to step 530, wherein the selection process is repeated. If the determination at step 550 is no (i.e. no more packets to process), the control is passed to step 560. At step 560 the algorithm is halted and reset and awaits the next data packet header for the routing and scheduling of subsequent data packets.

Returning now to step 540, if the determination is yes, (i.e. that the data packet is greater than the minimally identified occupied buffer in the FDL) control passes to step 555. At step 555 the packet in question is drop and all remaining packets in the queue are drop. This result is based on the fact that if the shortest packet chosen and the buffer with the largest buffer capacity is too small to accept the smallest data packet then all of the remaining data packets will also exceed the FDL buffer capacity, thus all packets should be dropped.

Control then passes to step 560 where the algorithm is halted and awaits the next group of data packet headers and subsequent data packets to be processed, scheduled and routed.

It will be apparent to those skilled in the art that various modifications and variations can be made in the various algorithms of the present invention and in construction of the "ALL-OPTICAL NETWORKING OPTICAL FIBER LINE DELAY BUFFERING APPARATUS AND METHOD" without departing from the scope or spirit of the invention.

Other embodiments of the invention will be apparent to those skilled in the art from consideration of the specification and practice of the invention disclosed herein and in the publication "All-Optical Networking: Architecture, Control, and Management Issues" authors: Lakshman S. Tamil, Francesco Masetti Tom McDermott, Gerardo Castanon, An Ge and Ljubisa Tancevski, published by The International Society for Optical Engineering, 3–5 Nov., 1998, which is hereby fully incorporated by reference. It is intended that the specification and examples be considered as exemplary only, with a true scope and spirit of the invention being indicated by the following claims.

What is claimed is:

1. A method for wavelength division multiplexing (WDM) fiber delay line (FDL) optical buffer routing and scheduling of conflicted data packets through an optical router with memory, the method comprising the steps of:
    ordering of each conflicted data packet;
    selecting each of the data packets in turn for routing based on the ordering sequence;
    assigning each conflicted data packet a wavelength in said FDL optical buffer from (n) available wavelengths in said FDL, sequentially, wherein the sequencing of (n) is $(n)=\lambda_1, \lambda_2, \ldots, \lambda_n, \lambda_1, \lambda_2, \ldots, \lambda_n, \ldots$;
    converting each data packet to the sequentially assigned wavelength (n); and
    routing the data packets to an optical buffer according to the wavelength assignment, wherein if the wavelength of the assigned FDL optical buffer is fully occupied the data packet is dropped.

2. The method for wavelength division multiplexing (WDM) fiber delay line (FDL) routing according to claim 1, wherein the ordering is sequential based on the originating port of the data packet.

3. The method for wavelength division multiplexing (WDM) fiber delay line (FDL) routing according to claim 2, wherein if the data packet assigned wavelength and the data packet originating wavelength are the same, the data packet is not converted to the assigned wavelength.

4. The method for wavelength division multiplexing (WDM) fiber delay line (FDL) routing according to claim 3, wherein the data packets are of a variable length.

5. The method for wavelength division multiplexing (WDM) fiber delay line (FDL) routing according to claim 1, wherein the ordering sequence of the data packets is chosen at random.

6. The method for wavelength division multiplexing (WDM) fiber delay line (FDL) routing according to claim 5, wherein the data packets are of a variable length.

7. The method for wavelength division multiplexing (WDM) fiber delay line (FDL) routing according to claim 6, wherein upon completion of the routing of the conflicted data packets the assignment of the wavelength (n) begins, for each subsequent group of conflicted data packets, at a next wavelength (n) in the sequence.

8. The method for wavelength division multiplexing (WDM) fiber delay line (FDL) routing according to claim 6, wherein upon completion of the routing of the conflicted data packets the assignment of the wavelength (n) begins, for each subsequent group of conflicted data packets, a first wavelength (n) in the sequence.

9. The method for wavelength division multiplexing (WDM) fiber delay line (FDL) routing according to claim 1, wherein wavelength (n) is assigned in a predetermined order to exhaust each of the (n) wavelengths in the FDL.

10. The method for wavelength division multiplexing (WDM) fiber delay line (FDL) routing according to claim 9, wherein the data packets are of a variable length.

11. The method for wavelength division multiplexing (WDM) fiber delay line (FDL) routing according to claim 10, wherein upon completion of the routing of the conflicted data packets the assignment of the wavelength (n) begins, for each subsequent group of conflicted data packets, at a next wavelength (n) in the sequence.

12. The method for wavelength division multiplexing (WDM) fiber delay line (FDL) routing according to claim 10, wherein upon completion of the routing of the conflicted data packets the assignment of the wavelength (n) begins, for each subsequent group of conflicted data packets, a first wavelength (n) in the sequence.

13. The method for wavelength division multiplexing (WDM) fiber delay line (FDL) routing according to claim 1, wherein the data packets are of a variable length.

14. The method for wavelength division multiplexing (WDM) fiber delay line (FDL) routing according to claim 13, wherein upon completion of the routing of the conflicted data packets the assignment of the wavelength (n) begins, for each subsequent group of conflicted data packets, at a next wavelength (n) in the sequence.

15. The method for wavelength division multiplexing (WDM) fiber delay line (FDL) routing according to claim 13, wherein upon completion of the routing of the conflicted data packets the assignment of the wavelength (n) begins, for each subsequent group of conflicted data packets, a first wavelength (n) in the sequence.

16. The method for wavelength division multiplexing (WDM) fiber delay line (FDL) routing according to claim 1, wherein upon completion of the routing of the conflicted data packets the assignment of the wavelength (n) begins, for each subsequent group of conflicted data packets, at a next wavelength (n) in the sequence.

17. The method for wavelength division multiplexing (WDM) fiber delay line (FDL) routing according to claim 1, wherein upon completion of the routing of the conflicted data packets the assignment of the wavelength (n) begins, for each subsequent group of conflicted data packets, a first wavelength (n) in the sequence.

18. A system for wavelength division multiplexing (WDM) fiber delay line (FDL) optical buffer routing and scheduling of conflicted data packets through an optical router, the system comprising:

a fiber delay line (FDL) optical buffer, an optical router in communication with the FDL optical buffer, the optical router performing functions comprising of ordering each conflicted data packet;

selecting each of the data packets in turn for routing based on the ordering sequence;

assigning each conflicted data packet a wavelength in the FDL optical buffer, from (n) available wavelengths in the FDL, sequentially, wherein the sequencing of (n) is (n)=$\lambda_1, \lambda_2, \ldots, \lambda_n, \lambda_1, \lambda_2, \ldots, \lambda_n, \ldots$;

converting each data packet to the sequentially assigned wavelength (n), and routing the data packets to an optical buffer according to the wavelength assignment, wherein if the wavelength of the assigned FDL optical butter is fully occupied the the data packet is dropped.

19. The system for wavelength division multiplexing (WDM) fiber delay line (FDL) routing according to claim 18, wherein the ordering is sequential based on the originating port of the data packet.

20. The system for wavelength division multiplexing (WDM) fiber delay line (FDL) routing according to claim 19, wherein if the data packet assigned wavelength and the data packet originating wavelength are the same, the data packet is not converted to the assigned wavelength.

21. The system for wavelength division multiplexing (WDM) fiber delay line (FDL) routing according to claim 20, wherein the data packets are of a variable length.

22. The system for wavelength division multiplexing (WDM) fiber delay line (FDL) routing according to claim 18, wherein the ordering sequence of the data packets is chosen at random.

23. The system for wavelength division multiplexing (WDM) fiber delay line (FDL) routing according to claim 22, wherein the data packets are of a variable length.

24. The system for wavelength division multiplexing (WDM) fiber delay line (FDL) routing according to claim 23, wherein upon completion of the routing of the conflicted data packets the assignment of the wavelength (n) begins, for each subsequent group of conflicted data packets, at a next wavelength (n) in the sequence.

25. The system for wavelength division multiplexing (WDM) fiber delay line (FDL) routing according to claim 23, wherein upon completion of the routing of the conflicted data packets the assignment of the wavelength (n) begins, for each subsequent group of conflicted data packets, a first wavelength (n) in the sequence.

26. The system for wavelength division multiplexing (WDM) fiber delay line (FDL) routing according to claim 18, wherein wavelength (n) is assigned in a predetermined order to exhaust each of the (n) wavelengths in the FDL.

27. The system for wavelength division multiplexing (WDM) fiber delay line (FDL) routing according to claim 26, wherein the data packets are of a variable length.

28. The system for wavelength division multiplexing (WDM) fiber delay line (FDL) routing according to claim 27, wherein upon completion of the routing of the conflicted data packets the assignment of the wavelength (n) begins, for each subsequent group of conflicted data packets, at anext wavelength (n) in the sequence.

29. The system for wavelength division multiplexing (WDM) fiber delay line (FDL) routing according to claim 27, wherein upon completion of the routing of the conflicted data packets the assignment of the wavelength (n) begins, for each subsequent group of conflicted data packets, a first wavelength (n) in the sequence.

30. The system for wavelength division multiplexing (WDM) fiber delay line (FDL) routing according to claim 18, wherein the dam packets are of a variable lent.

31. The system for wavelength division multiplexing (WDM) fiber delay line (FDL) routing according to claim 30, wherein upon completion of the routing of the conflicted data packets the assist t of the wavelength (n) begins, for each subsequent group of conflicted data packets, at a next wavelength (n) in the sequence.

32. The system for wavelength division multiplexing (WDM) fiber delay line (FDL) routing according to claim 30, wherein upon completion of the routing of the conflicted data packets the assignment of the wavelength (n) begins, for each subsequent group of conflicted data packets, a first wavelength (n) in the sequence.

33. The system for wavelength division multiplexing (WDM) fiber delay line (FDL) routing according to claim 18, wherein upon completion of the routing of the conflicted data packets the assignment of the wavelength (n) begins, for each subsequent group of conflicted data packets, at a next wavelength (n) in the sequence.

34. The system for wavelength division multiplexing (WDM) fiber delay line (FDL) routing according to claim 18, wherein upon completion of the routing of the conflicted data packets the assignment of the wavelength (n) begins, for each subsequent group of conflicted data packets, a first wavelength (n) in the sequence.

35. A system for wavelength division multiplexing (WDM) fiber delay line (FDL) optical buffer routing and scheduling of conflicted data packets through an optical router, the system comprising means for ordering of each conflicted data packet;

means for selecting each of the data packets in turn for routing based on the ordering sequence;

means for assigning each conflicted data packet a wavelength in said FDL optical buffer from (n) available wavelength in said FDL, sequentially, wherein the sequencing of (n) is (n)=$\lambda_1, \lambda_2, \ldots, \lambda_n, \lambda_1, \lambda_2, \ldots, \lambda_n, \ldots$;

means for converting each data packet to the sequentially assigned wavelength (n); and means for routing the data packets to an optical buffer according to the wavelength assignment, wherein if the wavelength of the assigned FDL optical buffer is fully occupied the data packet is dropped.

36. The system for wavelength division multiplexing (WDM) fiber delay line (FDL) routing according to claim 35, wherein the ordering is sequential based on the originating port of the data packet.

37. The system for wavelength division multiplexing (WDM) fiber delay line (FDL) routing according to claim 36, wherein if the data packet assigned wavelength and the data packet originating wavelength are the same, the data packet is not converted to the assigned wavelength.

38. The system for wavelength division multiplexing (WDM) fiber delay line (FDL) routing according to claim 37, wherein the data packets are of a variable length.

39. The system for wavelength division multiplexing (WDM) fiber delay line (FDL) routing according to claim 35, wherein the ordering sequence of the data packets is chosen at random.

40. The system for wavelength division multiplexing (WDM) fiber delay line (FDL) routing according to claim 35, wherein the data packets are of a variable length.

41. The system wavelength division multiplexing (WDM) fiber delay line (FDL) routing according to claim 40, wherein wavelength (n) is assigned in a predetermined order to exhaust each of the (n) wavelengths in the FDL.

42. The system for wavelength division multiplexing (WDM) fiber delay line (FDL) routing according to claim 40, wherein the ordering sequence of the data packets is chosen at random.

43. The system for wavelength division multiplexing (WDM) fiber delay line (FDL) routing according to claim 40, wherein upon completion of the routing of the conflicted data packets the assignment of the wavelength (n) begins, for each subsequent group of conflicted data packets, at a next wavelength (n) in the sequence.

44. The system for wavelength division multiplexing (WDM) fiber delay line (FDL) routing according to claim 40, wherein upon completion of the routing of the conflicted data packets the assignment of the wavelength (n) begins, for each subsequent group of conflicted data packets, a first wavelength (n) in the sequence.

45. The system for wavelength division multiplexing (WDM) fiber delay line (FDL) routing according to claim 35, wherein upon completion of the routing of the conflicted data packets the assignment of the wavelength (n) begins, for each subsequent group of conflicted data packets, at a next wavelength (n) in the sequence.

46. The system for wavelength division multiplexing (WDM) fiber delay line (FDL) routing according to claim 35, wherein upon completion of the routing of the conflicted data packets the assignment of the wavelength (n) begins, for each subsequent group of conflicted data packets, a first wavelength (n) in the sequence.

* * * * *